Figure 1:
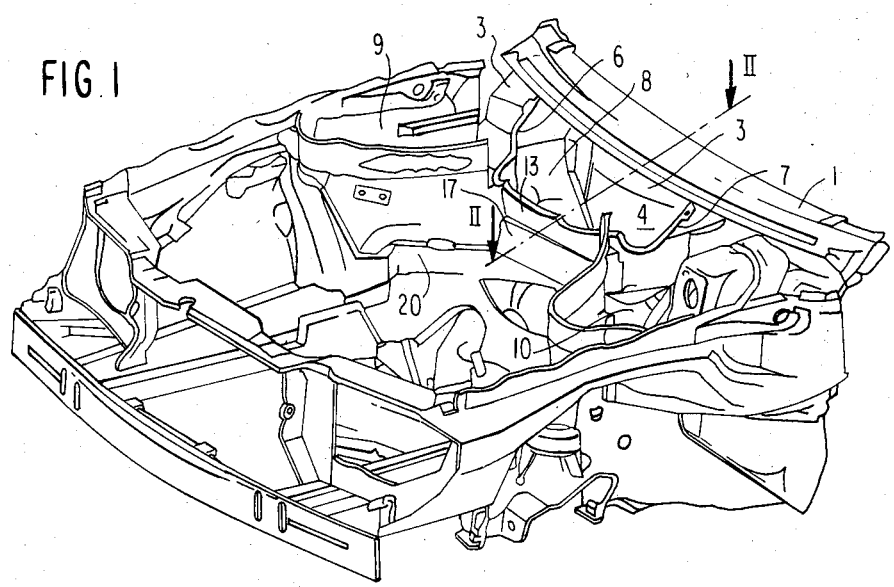

United States Patent [19]

Schöppel et al.

[11] Patent Number: 4,601,510
[45] Date of Patent: Jul. 22, 1986

[54] FRONT BODY STRUCTURE FOR MOTOR VEHICLE

[75] Inventors: Roman Schöppel, Sindelfingen; Manfred Mordaü, Wildberg; Gerhard Burk, Sindelfingen, all of Fed. Rep. of Germany

[73] Assignee: Daimler-Benz AG, Fed. Rep. of Germany

[21] Appl. No.: 690,536

[22] Filed: Jan. 11, 1985

[30] Foreign Application Priority Data

Jan. 14, 1984 [DE] Fed. Rep. of Germany ....... 3401127

[51] Int. Cl.⁴ ............................................ B62D 31/00
[52] U.S. Cl. ..................................... 296/194; 296/208
[58] Field of Search ............... 296/194, 192, 193, 196, 296/197, 208

[56] References Cited

U.S. PATENT DOCUMENTS

| | | | |
|---|---|---|---|
| 2,654,634 | 10/1953 | Zummach | 296/194 |
| 2,998,280 | 8/1961 | Barenyi | 296/208 |
| 3,188,132 | 6/1965 | Schwiering | 296/194 |
| 3,596,978 | 8/1971 | Wessells | 296/194 |
| 4,391,465 | 7/1983 | Piano | 296/208 |
| 4,449,749 | 5/1984 | Eger | 296/194 |
| 4,466,653 | 8/1984 | Harasaki | 296/194 |

*Primary Examiner*—Robert R. Song
*Attorney, Agent, or Firm*—Craig and Burns

[57] ABSTRACT

A front body structure for motor vehicles, with an end wall and with an equipment space which is arranged in front of the end wall in the engine space and is partitioned off from the latter and which is covered at the top by an engine hood, there being in the central region of the end wall and air-passage orifice for a blower located in the equipment space as part of a heating air-conditioning system. To ensure that sensitive built-in parts are accommodated so as to be protected and that, at the same time, the front body structure is reinforced, the invention proposes to divide the equipment space into three regions by means of longitudinal walls serving at the same time for stiffening, and to supplement the transverse wall of the central region, this transverse wall facing the engine space, with an attached half-shell, to form the hollow girder serving for guiding communicating lines such as electrical lines.

3 Claims, 2 Drawing Figures

FRONT BODY STRUCTURE FOR MOTOR VEHICLE

The invention relates to a front body structure for motor vehicles, with an end wall and with an equipment space which is located in front of the end wall in the engine space and is partitioned off from the latter and which is covered at the top by an engine hood there being in the central region of the end wall an air-passage orifice for a blower located in the equipment space and belonging to a heating and/or air-conditioning system, and the equipment space being divided into a central space and two lateral spaces located on the right and left of this by means of two walls connected to the end wall on both sides of the air-passage orifice and extending approximately in the longitudinal direction of the vehicle.

A motor-vehicle front body structure with a centrally arranged blower space and a laterally adjacent water separation space is already known from German Offenlegungsschrift No. 2,057,886, the inflow of air occurring above the water separation space. As a result, all the spaces communicate directly or indirectly with the outside air.

The object of the present invention is to provide a front body structure for motor vehicles, in which both a blower requiring outside air and, for example, sensitive electronic devices, electrical lines or the like can be accommodated in the best possible way. Furthermore, the loss of structural stability resulting from the air-passage orifice required for the blower air and located in the end wall is compensated for.

According to the invention, only the central space communicates at the top with the free atmosphere via a gap between the rear end of the engine hood and the windshield, for the purpose of sucking in air for the heating and/or air-conditioning system, and because a hollow girder is formed by means of a half-shell attached to the side, facing the engine space, of the front transverse wall of the central space, this hollow girder connecting the two outer spaces of the equipment space and serving for receiving communicating lines, for example, electrical lines or the like.

Although German Patent Specification No. 3,142,484 already makes known a blower space communicating with the outside air via a gap between the engine hood and the windshield, nevertheless no further equipment spaces are provided. Consequently, this publication was unable to give any suggestion towards the solution as a whole provided according to the invention herein described.

Particularly high strength of the front body structure is achieved, in an embodiment of the invention, due to the fact that the hollow girder connects two front fork-support branches of the vehicle structure.

Finally, expensive corrosion-protection measures at welding seams can be omitted, if, in a further advantageous feature of the invention, the bottom region, adjoining the end wall, of the central space is bent upwards in such a way that a welding seam connecting it to the end wall is located above a maximum possible water level in the bottom region.

Figure 2:
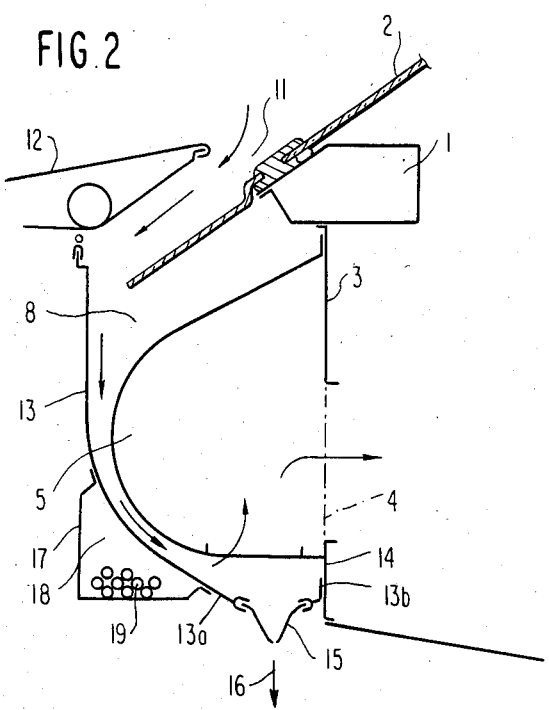

The above and other objects, features, and advantages of the present invention will become more apparent from the following description when taken in connection with the accompanying drawings which show, for the purpose of illustration only, one embodiment in accordance with the present invention, and wherein:

FIG. 1 shows a perspective plan view of the front-attachment region of a passenger car or estate car in its bare framework state and, FIG. 2 shows a section along the line II—II in FIG. 1.

Turning now to a consideration of the drawings wherein like elements are designated by like reference numerals, FIG. 1 shows a front body structure as an exemplary embodiment of the invention, for example that of a passenger car on an estate car, which has underneath a cross member 1, above which extends a windshield 2, an end wall 3 which is provided in its central region with an air-passage orifice 4 for air conveyed by a blower 5.

Located in front of the end wall 3 is an equipment space which is divided into a central space 8 and two lateral spaces 9 and 10 located on the right and left of this by means of two partition walls 6, 7 extending somewhat obliquely relative to the longitudinal axis of the vehicle and connected to the end wall 3.

The lateral spaces 9, 10 can be ventilated, for example via lateral bonnet gaps, but it is necessary to ensure, at the same time, that no water can penetrate into these spaces.

In contrast to this, the central space 8, which has a large air requirement because of the blower 5 of the heating and/or air-conditioning system, communicates with the free outside air via a gap 11 between the rear end of the engine hood 12 and the windshield 2. The air stream through the central space 8 is indicated by arrows. The space 8 is partitioned off from the engine space by a transverse wall 13 which also forms the bottom region surface 13a of this space, which is directed or bent upwards at the end wall 3 in its part 13b to form a collecting space for water rising to a predetermined level, so that a weld seam 14 serving for connection to the end wall 3 is located above the maximum possible predetermined water level in the bottom region, as a result of which no special corrosion-protection measures are required in the transverse wall.

A water run-off spout 15, through which collecting water can flow off in the direction of the arrow 16, is inserted into the bottom region 13a.

Attached to the outer face of the transverse wall 13 facing the engine space is a half-shell 17, by means of which a closed hollow girder 18 is formed, this hollow girder 18 connecting the lateral spaces 9, 10 to one another and serving for accommodating communicating lines such as electrical lines 19 and the like so as to protect them.

The hollow girder 18, formed by the half-shell 17 and the transverse wall 13 and extending in the transverse direction of the vehicle, also connects two fork-support branches 20 to one another, thereby substantially increasing the distortion resistance of the front attachment. In the event of a crash, this hollow girder maintains the two inner fork-support branches 20 in their structural position and thus prevents them from buckling prematurely or prevents, as a chain reaction, a collapse of the entire supporting structure in this region.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A front body structure for motor vehicles, with an end wall and with an equipment space which is located in front of the end wall in the engine space and is partitioned off from the engine space and which is covered on top of an engine hood,
- a heating air-conditioning air-passage orifice for a blower located in the equipment space, the air-passage being in the central region of the end wall, spaced partition walls connected to the end wall on both sides of the air-passage orifice and extending approximately in the longitudinal direction of the vehicle for dividing the equipment space into a central space and two lateral spaces, one each located on the right and left of the central space, wherein only the central space communicates at the top with the free atmosphere via a gap between the rear end of the engine hood and the windshield, for sucking in air for the heating air-conditioning system,
- a hollow girder means formed by means of a half-shell attached to the side facing the engine space of a front transverse wall of the central space for connecting the two lateral spaces of the equipment space to receive communicating lines.

2. A front body structure according to claim 1, wherein the hollow girder connects two front fork-support branches of the vehicle structure.

3. A front body structure according to claim 1, wherein a bottom region surface, adjoining the end wall, of the central space is directed upwards forming a collecting space for water having a predetermined level, a welding seam connecting the bottom region surface to the end wall above the maximum possible predetermined water level in the bottom region.

* * * * *